(12) United States Patent
Radu et al.

(10) Patent No.: US 9,239,796 B2
(45) Date of Patent: Jan. 19, 2016

(54) METHODS, SYSTEMS, AND COMPUTER READABLE MEDIA FOR CACHING AND USING SCATTER LIST METADATA TO CONTROL DIRECT MEMORY ACCESS (DMA) RECEIVING OF NETWORK PROTOCOL DATA

(75) Inventors: Octavian Mihai Radu, Ploiesti (RO); Robert Brian Luking, Ellicott City, MD (US)

(73) Assignee: IXIA, Calabasas, CA (US)

( * ) Notice: Subject to any disclaimer, the term of this patent is extended or adjusted under 35 U.S.C. 154(b) by 387 days.

(21) Appl. No.: 13/115,078

(22) Filed: May 24, 2011

(65) Prior Publication Data

US 2012/0303887 A1 Nov. 29, 2012

(51) Int. Cl.
*G06F 12/08* (2006.01)
*G06F 13/28* (2006.01)

(52) U.S. Cl.
CPC ............ *G06F 12/0875* (2013.01); *G06F 13/28* (2013.01)

(58) Field of Classification Search
CPC .............................. G06F 12/0875; G06F 13/28
USPC ........................................................ 711/113
See application file for complete search history.

(56) References Cited

U.S. PATENT DOCUMENTS

| 4,875,155 | A * | 10/1989 | Iskiyan et al. ................ 711/113 |
| 7,496,699 | B2 * | 2/2009 | Pope et al. ...................... 710/52 |
| 7,506,073 | B2 * | 3/2009 | Kuik et al. .................... 709/249 |
| 7,600,163 | B2 * | 10/2009 | Wan et al. ..................... 714/701 |
| 7,676,814 | B2 * | 3/2010 | Karighattam et al. ........ 719/319 |
| 7,826,381 | B1 * | 11/2010 | Kastuar et al. ................ 370/242 |
| 8,019,901 | B2 * | 9/2011 | Starr et al. .................... 709/250 |
| 8,176,252 | B1 * | 5/2012 | Alexander et al. ............ 711/118 |
| 2006/0090016 | A1 * | 4/2006 | Edirisooriya ................... 710/22 |
| 2008/0212567 | A1 | 9/2008 | El-Hennawey et al. |

OTHER PUBLICATIONS

Intel® 82599 10 GbE Controller Datasheet, 322429-008, Revision No. 2.7, p. 420 (Apr. 2011). http://download.intel.com/design/network/datashts/82599_datasheet.pdf.
Silberschatz et al., *Operating System Concepts*, John Wiley & Sons, Inc., pp. 503-504 (2005).

* cited by examiner

*Primary Examiner* — Michael Alsip
(74) *Attorney, Agent, or Firm* — Jenkins, Wilson, Taylor & Hunt, P.A.

(57) ABSTRACT

Methods, systems, and computer readable media for caching and using scatter list metadata to control DMA receiving of network protocol data are described. According to one method, metadata associated with partially used scatter list entries is cached in memory of a scatter list caching engine. Data to be written to host system memory is received. The scatter list caching engine provides the metadata associated with partially used scatter list entries to a DMA controller to control the DMA writing of the data into host system memory.

20 Claims, 4 Drawing Sheets

METHODS, SYSTEMS, AND COMPUTER READABLE MEDIA FOR CACHING AND USING SCATTER LIST METADATA TO CONTROL DIRECT MEMORY ACCESS (DMA) RECEIVING OF NETWORK PROTOCOL DATA

TECHNICAL FIELD

The subject matter disclosed herein receiving network protocol data using DMA. More particularly, the subject matter described herein relates to caching and using scatter list metadata to control DMA receiving of network protocol data.

BACKGROUND

Network and storage array test devices, such as protocol emulators and/or protocol analyzers are often required to receive data and store the data in internal memory at line rates. For example, a protocol emulator that emulates a storage array connected via a storage area network may be required to receive and store data at fiber channel line rates on the order of gigabits per second or tens of gigabits per second.

In light of the high line rates encountered by network and storage array test devices, it is desirable to utilize an efficient mechanism for receiving data into host (test device) memory. One possible way to receive data into host memory is to use the host central processing unit (CPU) to control the receiving of data into memory. Using the host CPU to control the receiving of data into memory is undesirable because the host CPU is not optimized for such high speed transfers and is often busy performing other tasks.

Another possible mechanism for receiving high speed data into host memory is to use direct memory access or DMA. When using DMA, special purpose hardware, referred to as a DMA controller, controls the writing of data into host memory, with minimal involvement by the host CPU. As a result, the host CPU is free to perform other tasks, and the DMA controller can be optimized for high speed data transfer required, for example, when the host device is emulating a storage area network.

In order to perform a DMA transfer, the DMA controller must be provided with the address in memory where data is to be written and the amount of space available beginning at the memory address. Scatter lists are one mechanism used in providing address and buffer information to a DMA controller. A scatter list is a linked list of pointers to host memory and corresponding buffer sizes. A scatter list may be created by host system software for storing data received from an I/O device, such as a protocol offload engine (specialized hardware that is design to extract protocol data from packets received over a network). Thousands of scatter list entries may be created by a protocol emulator or analyzer to monitor sessions of interest. These entries may be stored in host system memory. Because it is desirable to offload data transfer from the host CPU, there exists a need for an efficient way to provide scatter list information to the DMA controller.

One possible way to provide scatter list information to the DMA controller is to cache scatter list entries in memory of the protocol offload engine or other device that interfaces with the DMA controller. However, because memory may be limited on the protocol offload engine, only portions of the scatter list can be cached. As a result, the cache on the protocol offload engine must be frequently refilled. In addition, once a scatter list entry is used or partially used by writing data that fully or partially fills a location in host memory corresponding to a scatter list entry, a possible implementation is to write the partially used scatter list entry back to host system memory and subsequently receive a new scatter list from host system software that reflects the partially used entry. Requiring writes to host system memory each time a scatter list is partially used and requiring a subsequent read from host system memory to use the remainder of a partially used entry is undesirable, as the reads and writes to host system memory slow protocol offload engine performance.

Accordingly, in light of these difficulties, there exists a need for methods, systems, and computer readable media for caching and using scatter list metadata to control DMA receiving of network protocol data.

SUMMARY

The subject matter described herein includes methods, systems, and computer readable media for caching and using scatter list metadata to control DMA receiving of network protocol data. According to one method, metadata associated with partially used scatter list entries is cached in memory of a scatter list caching engine. Data to be written to host system memory is received. The scatter list caching engine provides the metadata associated with partially used scatter list entries to a DMA controller to control the DMA writing of the data into host system memory.

The subject matter described herein may be implement using a non-transitory computer readable medium having stored thereon instructions that when executed by a processor or processor element, control the computer to perform steps. Exemplary computer readable media suitable for implementing the subject matter described herein include chip memory devices, disk memory devices, programmable logic devices, and application specific integrated circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be explained with reference to the accompanying drawing of which.

DETAILED DESCRIPTION

Figure 1:
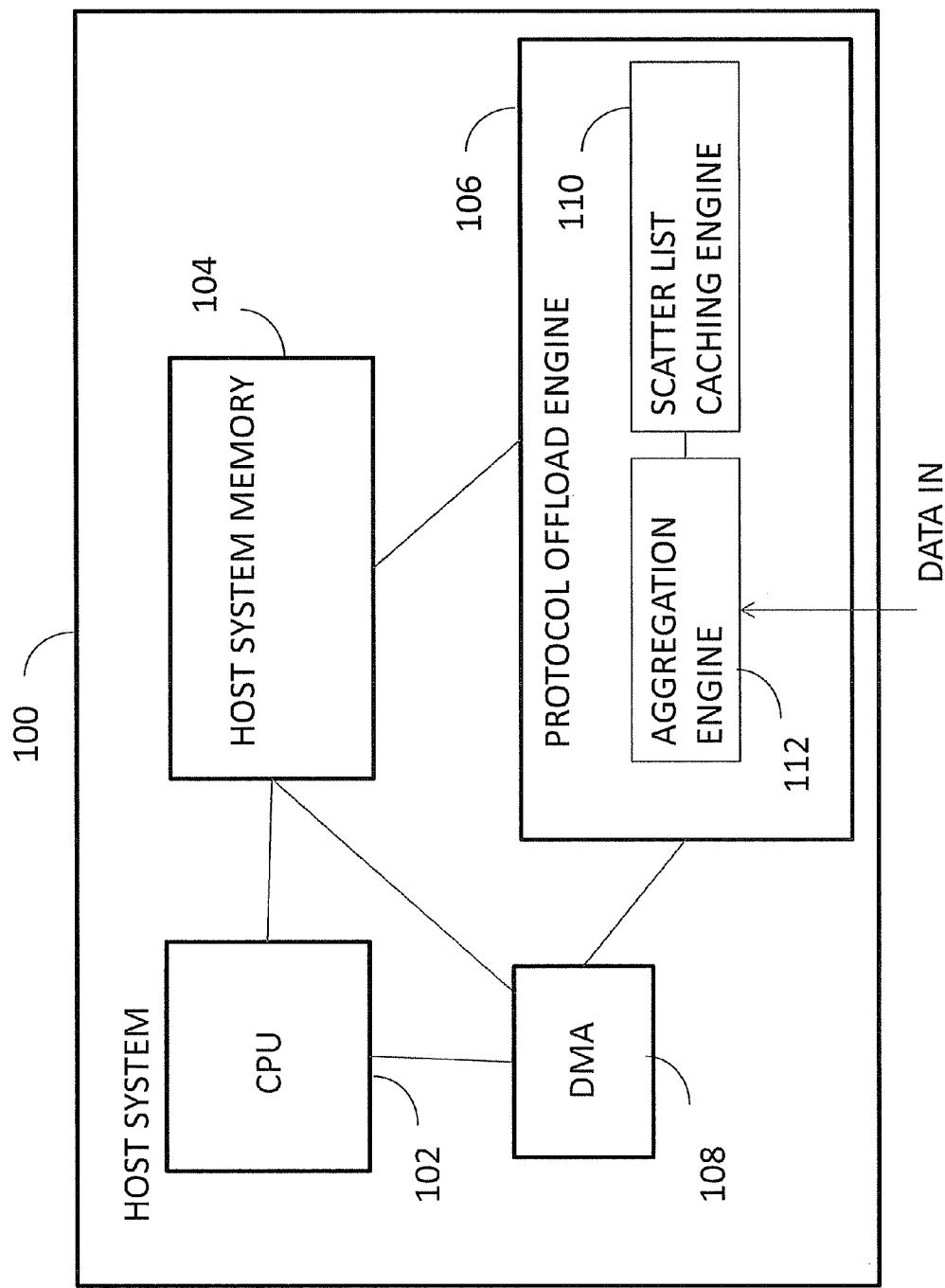
FIG. 1 is a block diagram of a host system that includes a scatter list caching engine according to an embodiment of the subject matter described herein.

The subject matter described herein includes methods, systems, and computer readable media for caching and using scatter list metadata for DMA transfers of network protocol data to host memory. FIG. 1 is a block diagram of an exemplary system for caching and using scatter list metadata for DMA transfers of network protocol data to host system memory according to an embodiment of the subject matter described herein. Referring to FIG. 1, a host system 100 includes a central processing unit 102 and host system memory 104 accessible by CPU 102. Host system 100 may be a protocol emulator or a protocol analyzer for receiving network protocol data from a network at high speeds and emulating a high speed device (in the case of an emulator) and/or analyzing the data once it is received. In one exemplary implementation, host system 100 may be a protocol emulator capable of emulating high speed devices, such as storage arrays, connected via a storage area network (SAN). In one exemplary implementation, host system 100 is preferably capable of receiving and transferring to host system memory 104 fiber channel 2 (FC-2) frames and fiber channel over Ethernet (FCoE) frames at line rates.

As a protocol emulator capable of emulating a storage area network, host system 100 may be configured to receive data at high speeds, e.g., at line speeds of a fiber channel interface, and store that data in host system memory 104 at the high speeds. As such, host system 100 may include a protocol offload engine 106 that controls the high speed offloading of the receiving of network protocol data. In this context, "offloading" refers to taking over processing that could be performed by CPU 102. To control high speed writing of data to host memory 104, host system 100 includes a DMA controller 108. DMA controller 108 receives address information, including partially used scatter list metadata, from a scatter list caching engine 110 and data from an aggregation engine 112 and writes the data to host system memory 104.

Aggregation engine 112 receives network protocol data to be written to host system memory 104 and requests scatter lists to determine where the data should be written. As stated above, a scatter list is a list of pointers and lengths that may be provided by host system software. In a protocol emulator that caches data from FCoE frames, the scatter lists may indicate where packet data will be placed in host system memory. Software of host system 100 may maintain a list of scatter lists for each session, where each list may be of the form:

<pointer 1> <length 1>
<pointer 2> <length 2>
...
<pointer n> <length n>

In the case of a protocol emulator, or analyzer, protocol emulation or analysis software may be programmed with sessions to be analyzed. The host system protocol emulation or analysis software may interact with host operating system software to generate scatter lists to store incoming network protocol data for each session.

The host system protocol emulation or analysis software, in combination with host operating system software may allocate as much memory as is available for each session. In one exemplary implementation, there may be about 64 megabytes allocated per session. If the allocated memory is insufficient to store all of the data for a given session, the corresponding scatter list will not have sufficient entries to serve incoming frames. In such a situation, scatter list caching engine 110 and/or aggregation engine 112 may determine that there are no more pointers, inform host system 110 of this fact, and stop the aggregation for the session. As soon as the host system software writes information for storing session data for all of the sessions into host system memory, scatter list caching engine 110 caches the first entry for each session.

When data is received for the first time for a given session, scatter list caching engine 110 is able to serve the first request from the cache.

As stated above, scatter list caching engine 110 obtains scatter list entries from host system memory 104 and caches metadata associated with previously used scatter list entries in memory internal to scatter list caching engine 110, rather than partially using a scatter list entry and writing the partially used scatter list entry to host memory 104. The metadata that is cached may include a pointer to the next unused location in a scatter list buffer after a previous write to a scatter list buffer that the remaining size of the scatter list buffer after the write. When aggregation engine 112 receives data for a session corresponding to the scatter list buffer, scatter list caching engine 110 provides the current scatter list pointer and the buffer size to DMA controller 108. DMA controller 108 controls the writing of the corresponding data to host system memory 104.

Figure 2:
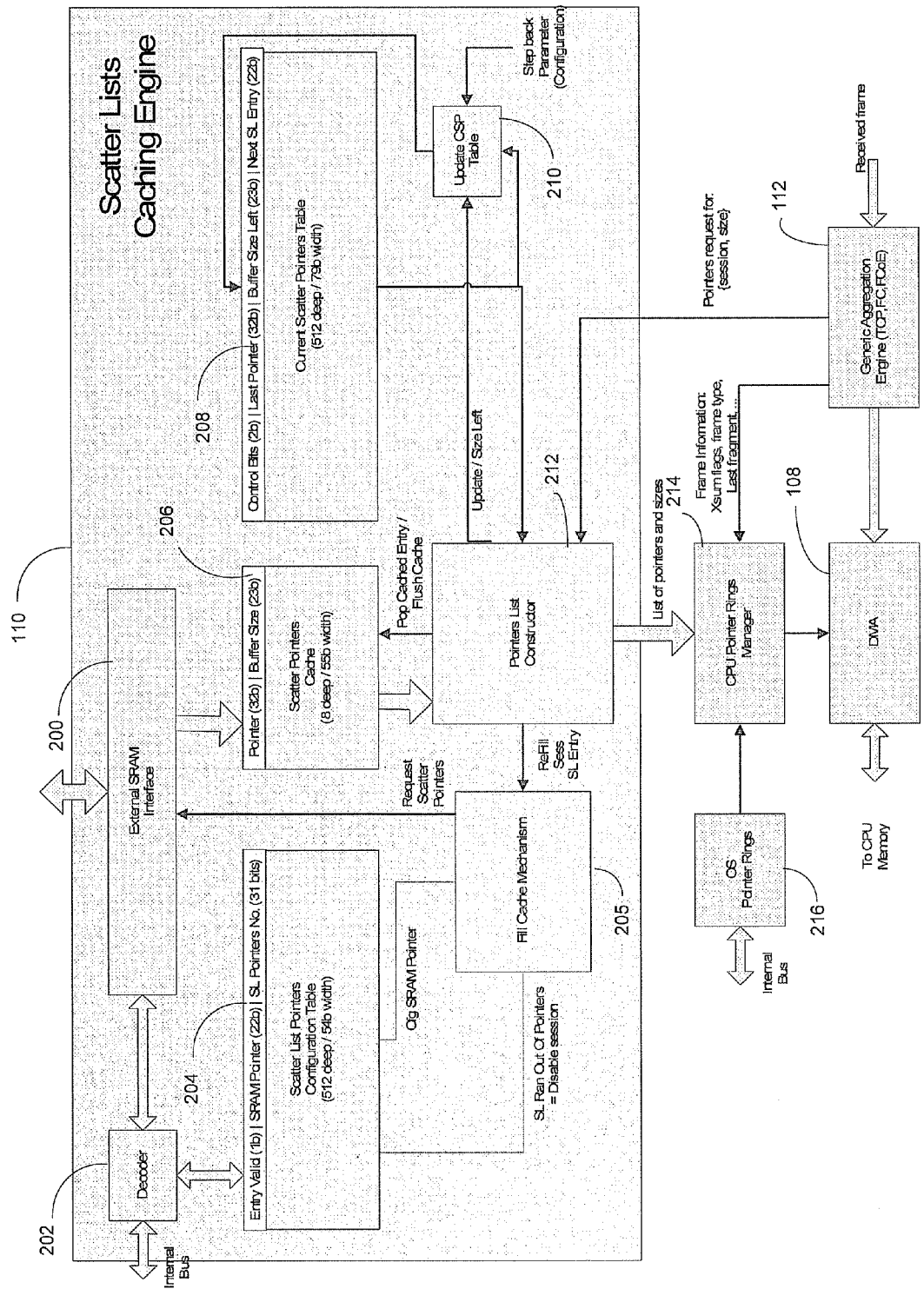
FIG. 2 is a block diagram illustrating an exemplary architecture for a scatter list caching engine according to an embodiment of the subject matter described herein.

FIG. 2 is a block diagram illustrating an exemplary architecture for scatter list caching engine 110 according to an embodiment of the subject matter described herein. Referring to FIG. 2, scatter list caching engine 110 interfaces with aggregation engine 112 to service requests from aggregation engine 112 to DMA transfer data using DMA controller 108 to host system memory 104. Scatter list caching engine 110 includes an external SRAM interface 200 for interfacing with host system memory 104. A decoder 202 decodes address signals on an internal system bus and provides the signals to SRAM interface 200 and to a scatter list pointers configuration table 204. Scatter list pointers configuration table 204 stores information that describes the scatter lists programmed for each session. In one exemplary implementation, scatter list pointers configuration table 204 stores an entry valid bit that, if set, indicates that there is a valid scatter list entry in memory for a session. When host system software writes a scatter list to memory for a given session, the host system software enables the entry valid bit in scatter list pointers configuration table 204. Scatter list pointers configuration table 204 may also store a pointer that represents the address in host system memory where the scatter list for a given session starts. Scatter list pointers configuration table 204 may also store data that indicates how many entries are in a scatter list for a given session. For example, if entry number 5 in scatter list configuration table 204 has the entry valid bit set, the SRAM pointer set to 0x1000 and the number of pointers set to 200, this means that host system software has programmed the scatter list for session 5, the scatter list is located at address 0x1000 and host system memory has 200 entries for the scatter list.

A fill cache mechanism 205 determines when the current list of scatter list pointers cached by scatter list caching engine 112 have been used and requests more pointers from host system memory 104. When there are no more pointers remaining in host system memory for a given session, that is, when a scatter list entry does not contain a pointer to a next scatter list entry for a given session, fill cache mechanism 205 may generate a signal to terminate a session. A scatter pointers table 206 stores scatter pointers and corresponding scatter buffer sizes received from host system memory. A current scatter pointers table 208 stores metadata associated with previously used scatter list entries. As stated above, this metadata may include the current scatter pointer indicating the next available location in a scatter buffer after a previous read and the remaining scatter buffer size. A current scatter pointers table updater 210 controls updates to current scatter pointers table 208 as data is DMA transferred to host system memory 104 using the scatter lists. A pointers list constructor 212 implements a state machine that provides the scatter list metadata, in the form of current scatter pointers and buffer sizes, to a CPU pointer rings manager 214. CPU pointer rings manager 214 provides the pointers and the corresponding buffer sizes to DMA controller 108. An operation system (OS) pointer rings manager 216 may be hardware for the operating system to receive DMA pointer rings. Pointer rings represent the standard receive mechanism in software. In a Linux implementation, the Linux kernel uses an sk buff data structure to describe each packet. When a packet arrives at a network interface card (NIC), it invokes DMA controller 108 to place the packet into the kernel memory via empty sk buffs stored in a ring buffer called rx ring. When a packet is processed at high layers, the packet data remains in the same kernel memory avoiding extra memory copies. Linux pointer rings are used to transfer the data when the session does not exist for a packet or is not enabled and when the scatter list runs out of pointers. Otherwise the pointers are received from scatter list caching engine 110.

Figure 3:
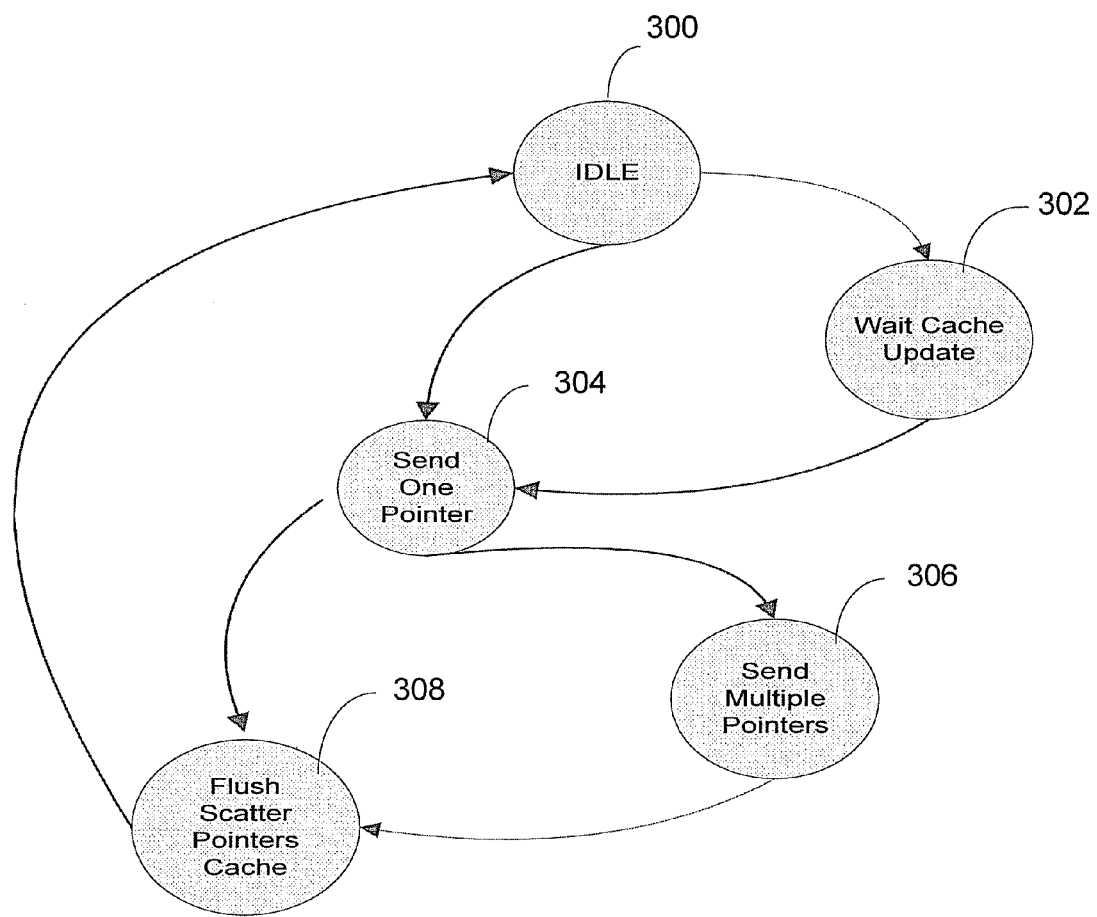
FIG. 3 is a state diagram illustrating exemplary states of a pointers list constructor of a scatter list caching engine according to an embodiment of the subject matter described herein.

As stated above, pointers list constructor 208 implements a finite state machine. The finite state machine requests the filling or flushing of scatter pointers cache 206 and implements the fragmentation logic. FIG. 3 is a state diagram illustrating exemplary states implemented by pointers list constructor 212 in providing the scatter list metadata to CPU pointer rings manager 214. Referring to FIG. 3, pointers list constructor 212 begins in an idle state 300. Pointers list constructor 212 transitions from idle state 300 to a wait for cache update state 302 to await new scatter list entries from the host. Pointers list constructor 212 transitions from idle state 300 or from wait for cache update state 302 to a send one pointer state 304 in response to determining that a single scatter list entry is required to write data received for a session into host system memory 104. Pointers list constructor 212 transitions from send one pointer state 304 to a send multiple pointers state 306 in response to determining that plural scatter list entries are required (in the fragmentation case) to write data received for a session to external memory. Pointers list constructor 212 transitions from send one pointer state 304 or send multiple pointers state 306 to a flush scatter pointers cache 308 in response to completely filling all of the buffers corresponding to the scatter list entries in scatter pointers cache 206. Once all current cached scatter list entries have been used, pointers list constructor 212 returns to idle state 300.

As stated above, host system 100 may be a protocol analyzer and/or a protocol emulator that caches session data for fiber channel sessions, including FC-2 carried over Ethernet at line rates. For FC-2 sessions, aggregation engine 112 may identify a session by a combination of destination ID (D/ID), source ID (S_ID), originator exchange identifier (OX_ID), and receiver exchange identifier (RX_ID) from the FC-2 header of a received frame. Aggregation engine 212 may use this combination of parameters to perform a lookup in a session table to identify the session to which a received frame belongs. If the lookup indicates that a received frame is a data frame for an existing session, aggregation engine 112 may request scatter list entries from scatter list caching engine 110 to store the data for the system in host memory 104.

Figure 4:
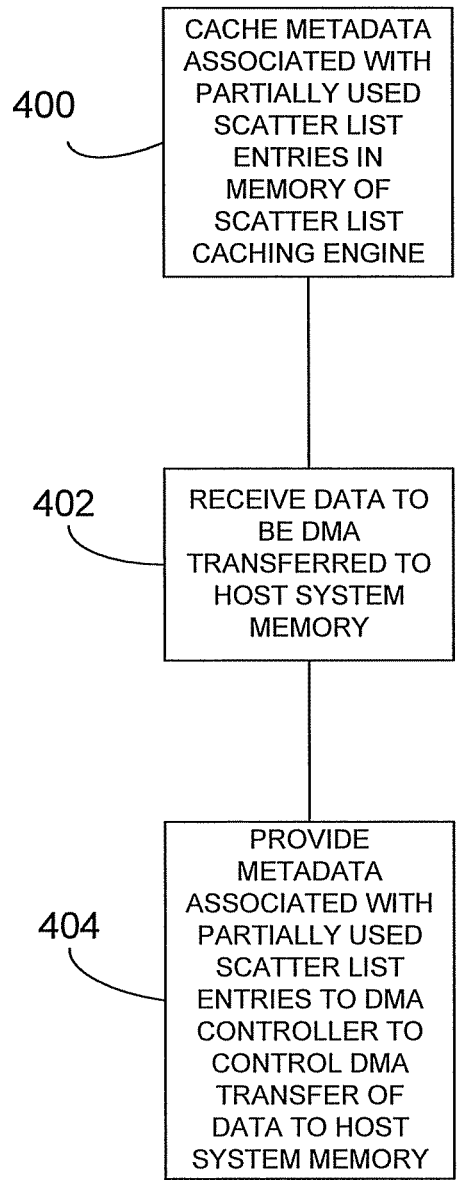
FIG. 4 is a flow chart illustrating exemplary overall steps performed by a system for caching and using scatter list metadata for DMA transfer of network protocol data to memory according to an embodiment of the subject matter described herein.

FIG. 4 is a flow chart illustrating exemplary overall steps that may be performed in caching and using scatter list metadata according to an embodiment of the subject matter described herein. Referring to FIG. 4, in step 400, metadata associated with partially used scatter list entries is cached in memory of a scatter list caching engine separate from host system memory. For example, scatter list caching engine 110 may store in its internal memory, for partially used scatter list entries, a pointer to a next available location in a scatter list buffer after a previous DMA transfer to the scatter list buffer and a remaining buffer size after the DMA transfer. In step 402, network protocol data to be written to the host system memory is received. For example, aggregation engine 112 may receive data from a network, identify the data as being associated with a previously identified session that for which data is to be DMA transferred to system memory 104, and request service from scatter list caching engine 110. In step 404, the metadata associated with partially used scatter list entries is provided to a DMA controller to control the DMA writing of the network protocol data into host system memory. For example, scatter list caching engine 110, in response to receiving the request from aggregation engine 112 may provide the previously cached current scatter list pointer and remaining buffer size for the unused scatter list entry for the session to DMA controller 108. DMA controller 108 may write the data to host system memory 104. If plural scatter list entries are necessary to service the request, scatter list caching engine 110 may fragment the data across plural scatter list entries and update the cached scatter list metadata for the entries.

The following example illustrates another example of how scatter list caching engine 110 caches scatter list metadata and uses the metadata to control DMA transfer of network protocol data to memory. In this example, it is assumed that host software advertises to scatter list caching engine 110 that a scatter list for session 1 has been created. The scatter list indicates that for session 1, 1024 bytes of host system memory have been allocated from host memory address 0x1000 and 512 bytes have been allocated from address 0x5000. Thus, in this example, the following two scatter list entries may be provided by host software to scatter list caching engine 110:

TABLE 1

Scatter List Entries Provided to Scatter List Caching Engine by Host System Software

| Scatter Pointer | Buffer Size | Next Scatter List Entry |
| --- | --- | --- |
| 0x1000 | 1024 | 2 |
| 0x5000 | 512 | 3 |

In Table 1, the first scatter list entry points to a buffer in host memory starting and address 0x000 and having a size of 1024 bytes. The first scatter list entry also points to 2 or the next scatter list entry. The second scatter list entry points to a buffer in host memory starting at address 0x500 and having a size of 512 bytes. The second scatter list entry points to the next scatter list entry or entry number 3. The scatter list entries in Table 1 may be provided to scatter list caching engine 110 by host system software to allocate buffer space in host system memory to receive data for a session being monitored by the host system software. In this example, the scatter list is in Table 1 is assumed to be allocated for session number 1. It is understood that a host protocol analyzer or protocol emulator in which scatter list caching engine 110 resides may allocate hundreds or even thousands of scatter lists, depending on the number of sessions being monitored. These scatter lists may be stored in host system memory and transferred to scatter list caching engine 110 when data for a corresponding session is received.

In this example, aggregation engine 112 receives a frame corresponding to session 1. Aggregation engine 112 extracts the 800 data bytes from the frame, and request 800 bytes for session 1 to scatter list caching engine 110. Scatter list caching engine 110 replies with one scatter entry, (0x1000, 800), as indicated by the first entry in Table 1 above. Aggregation engine 112 receives a second frame on session 1 and extracts 600 data bytes. Aggregation engine 112 requests 600 bytes for session 1 to scatter list caching engine 110 and scatter list caching engine 110 replies with two scatter entries: (0x1320, 224) and (0x5000, 376). The address 0x1320 represents the initial scatter list pointer 0x1000 plus 800 address locations to store the initial frame data (320 in hexadecimal is the same as 800 in decimal). The remaining buffer size 224 represents the initial buffer size of 1024−800 bytes=224 bytes remaining in the first scatter list entry after transferring the data from the first frame to host system memory. Since 224 bytes is not enough space to store the 600 bytes of data from the second frame, scatter list caching engine 110 must fragment the data from the second frame across multiple scatter list entries. In this case, there are 224 free locates in the buffer corresponding to the first scatter list entry, and 376 are need from the second scatter list entry. Thus, (0x5000, 376) represents the portion of the second scatter list entry to needed to receive the data from the second frame. Thus, scatter list metadata cached locally by scatter list caching engine 110 may include data such as the remaining buffer size and pointer to the next free location in a buffer corresponding to a scatter list after a DMA transfer of data received by aggregation engine 112 to host memory is performed.

One problem addressed by scatter list caching engine 110 is how to serve aggregation engine 112 in a timely manner and keep up the line speed. Because bringing pointers from external memory and writing the partially used entry back into external memory is time consuming, a caching mechanism is required. Scatter list caching engine 110 uses a small amount of local memory to cache partially used scatter list entries, rather than writing the partially used scatter list entries to host system memory, which saves resources and area on the chip that implements scatter list caching engine 110 over implementations that cache large numbers of scatter list caching entries provided by the host. In order to obtain scatter list entries for its local cache, scatter list caching engine 110 performs burst reads of 8 scatter list entries from external memory and stores the scatter list entries in a small memory, which in one exemplary implementation is 55 bits in width and 8 entries deep, represented by scatter pointers cache 206 illustrated in FIG. 2. The pointers in scatter pointers cache 206 represents the pool of pointers provided to pointers list constructor 212 to be provided in response to a request for service from aggregation engine 112.

While performing the burst reads of scatter list pointers from external memory, scatter list caching engine 110 maintains another table in local memory, represented by current scatter pointers table 208 illustrated in FIG. 2, which is responsible for storing partially used scatter entries and the address in the external memory from which to request more pointers. Scatter list pointers table 208 is used for both handle fragmentation and cache partially used entries instead of writing the partially used entries back to external memory.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for caching and using scatter list metadata to control DMA receiving of network protocol data by a protocol emulator, the method comprising:

in a network and storage array test device comprising a protocol emulator for receiving and transferring, to system memory of the protocol emulator, fiber channel frames at line rate:

providing a protocol offload engine that receives the fiber channel frames and offloads at least some processing of the fiber channel frames from a central processing unit of the protocol emulator;

caching metadata associated with partially used scatter list entries in memory of a scatter list caching engine comprising a component of the protocol offload engine, the memory of the scatter list caching engine being separate from the system memory of the protocol emulator;

receiving network protocol data to be written to the system memory of the protocol emulator; and providing, by the scatter list caching engine, the metadata associated with partially used scatter list entries to a DMA controller comprising a component of the protocol emulator to control the DMA writing of the network protocol data into the system memory of the protocol emulator.

2. The method of claim 1 wherein caching metadata associated with a partially used scatter list entry includes caching a current scatter list pointer that points to a next available location in a scatter list buffer corresponding to the scatter list entry following a previous DMA transfer to the scatter list buffer.

3. The method of claim 2 wherein caching metadata associated a partially used scatter list entry includes caching a current size of the scatter list buffer remaining after the previous DMA transfer to the scatter list buffer.

4. The method of claim 3 wherein providing the metadata associated with the scatter list entries to the DMA controller includes providing the current scatter list pointer and the current size of the scatter list buffer to the DMA controller.

5. The method of claim 1 wherein providing the metadata associated with the partially used scatter list entry includes providing metadata for fragmenting the writing of the data across at least one partially used scatter list entry and at least one unused scatter list entry.

6. The method of claim 1 comprising obtaining, by the scatter list caching engine, new scatter list entries from the system memory via burst reads of plural scatter list entries from the system memory.

7. The system of claim 6 wherein the burst reads occur simultaneously with the providing of the metadata to the DMA controller.

8. The method of claim 1 wherein the protocol emulator is configured to analyze received network protocol packets.

9. The method of claim 7 wherein the protocol emulator is configured to implement at least one storage array in a storage area network.

10. The method of claim 7 wherein the protocol emulator includes an aggregation engine for receiving the data and determining whether the data is associated with a fiber channel session.

11. A system for caching and using scatter list metadata to control DMA receiving of network protocol data by a protocol emulator, the system comprising:

a protocol emulator comprising a network and storage array test device for receiving and transferring, to system memory of the protocol emulator, fiber channel frames at line rate, the protocol emulator including:

a central processing unit;

a protocol offload engine that receives the fiber channel frames and offloads at least some processing of the fiber channel frames from the central processing unit;

wherein the system memory of the protocol emulator is accessible by the central processing unit;

an aggregation engine comprising a component of the protocol emulator for receiving data to be DMA transferred to the system memory;

a DMA controller comprising a component of the protocol emulator for controlling the DMA transfer of the network protocol data to the system memory of the protocol emulator; and a scatter list caching engine comprising a component of the protocol offload engine for caching metadata associated with partially used scatter list entries in memory of the scatter list caching engine separate from the system memory of the protocol emulator and for providing the metadata associated with partially used scatter list entries to the DMA controller to control the DMA writing of the network protocol data into the system memory of the protocol emulator.

12. The system of claim 11 wherein the scatter list caching engine is configure to cache a current scatter list pointer that points to a next available location in a scatter list buffer corresponding to the scatter list entry following a previous DMA transfer to the scatter list buffer.

13. The system of claim 12 wherein the scatter list caching engine is configured to cache a current size of the scatter list buffer remaining after the previous DMA transfer to the scatter list buffer.

14. The system of claim 13 wherein the scatter list caching engine is configured to provide the current scatter list pointer and the current size of the scatter list buffer to the DMA controller.

15. The system of claim 11 wherein the scatter list caching engine is configured to provide metadata for fragmenting the writing of the data across at least one partially used scatter list entry and at least one unused scatter list entry to the DMA controller.

16. The system of claim 11 wherein the scatter list caching engine is configured to obtain new scatter list entries from the system memory via burst reads of plural scatter list entries from the system memory.

17. The system of claim 11 wherein the protocol emulator is configured to analyze received network protocol packets.

18. The system of claim 17 wherein the protocol emulator is configured to implement at least one storage array in a storage area network.

19. The system of claim 18 wherein the aggregation engine is configured to determine whether the data is associated with a fiber channel session.

20. A non-transitory computer readable medium having stored thereon executable instructions that when executed by the processor of a computer control the computer to perform steps comprising:

in a network and storage array test device comprising a protocol emulator capable of receiving and transferring, to system memory of the protocol emulator, fiber channel frames at line rate:

providing a protocol offload engine that receives the fiber channel frames and offloads at least some processing of the fiber channel frames from a central processing unit of the protocol emulator;

caching metadata associated with partially used scatter list entries in memory of a scatter list caching engine comprising a component of the protocol offload engine, the memory of the scatter list caching engine being separate from the system memory of the protocol network emulator;

receiving network protocol data to be written to the system memory of the protocol emulator; and providing, by the scatter list caching engine, the metadata associated with partially used scatter list entries to a DMA controller comprising a component of the protocol emulator to control the DMA writing of the network protocol data into the system memory of the protocol emulator.

* * * * *